Oct. 13, 1970  D. W. WRIGHT  3,533,639
CHUCK CONSTRUCTION
Filed April 26, 1968
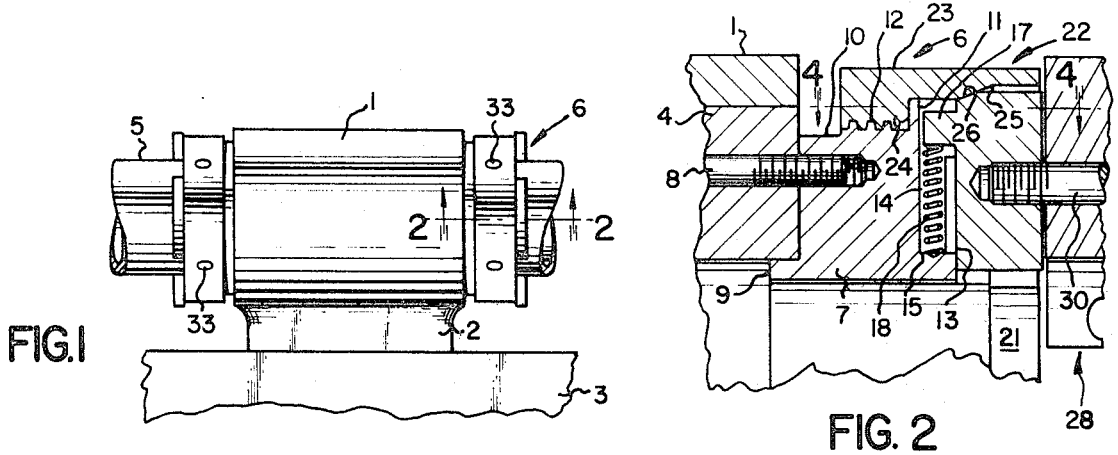
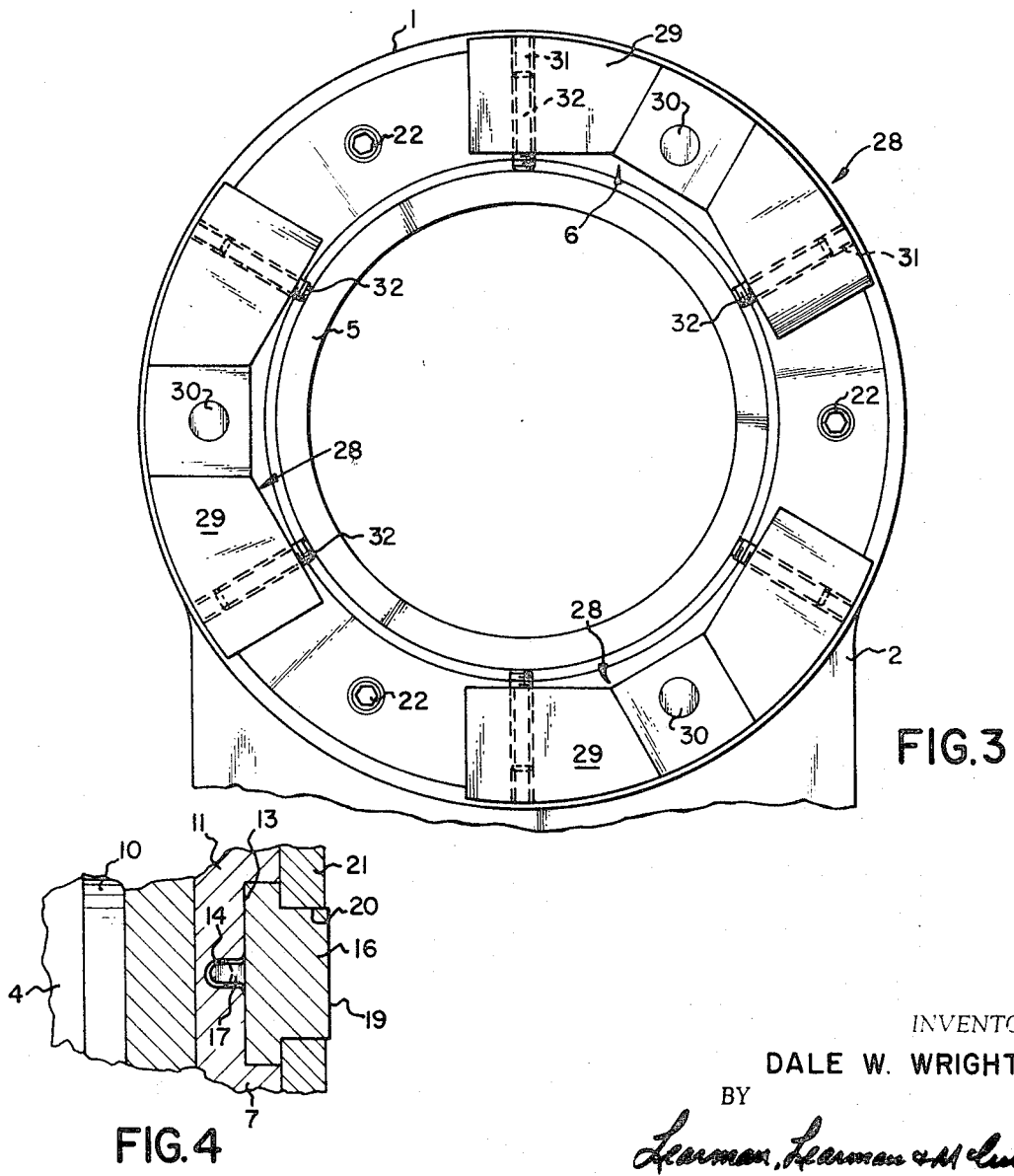
INVENTOR.
DALE W. WRIGHT
BY
*Learman, Learman & McCulloch*
ATTORNEYS ＃ 3,533,639
CHUCK CONSTRUCTION
Dale W. Wright, Saginaw, Mich., assignor to Miles Machinery Company, Saginaw, Mich., a corporation of Michigan
Filed Apr. 26, 1968, Ser. No. 724,526
Int. Cl. B23b *31/16*
U.S. Cl. 279—114                    7 Claims

ABSTRACT OF THE DISCLOSURE

A chuck having a rotatable annular support provided at each end with a plurality of circumferentially spaced, radially movable carriers on each of which is a jaw pivotal about an axis parallel to the axis of rotation of the support. At each end of the support is a threaded, annular scroll which is rotatable and axially movable relatively to the support and which has a cam surface that acts on each of the associated carriers to move simultaneously all jaws at one end of the support radially into and out of clamping engagement with a workpiece.

---

The apparatus disclosed herein comprises an annular chuck adapted to accommodate an elongated cylindrical or annular workpiece. At each end of the chuck is a plurality of workpiece-gripping jaws which are movable radially simultaneously into and out of clamping engagement with the workpiece. Each of the jaws is pivotal about an axis parallel to the axis of rotation of the annular support and has workpiece-engaging feet which are capable of compensating automatically for any eccentricity of the workpiece while providing uniform gripping pressure on the workpiece.

Apparatus of the kind herein disclosed is especially adapted for use in the holding of elongated, large diameter, cylindrical or annular workpieces which are to be bored, threaded, milled or otherwise machined in such manner as to necessitate chucking of the workpiece between its ends. Conventional collet chucks are not altogether satifscatory inasmuch as the jaws of a conventional collet, when actuated to move radially into gripping relation with a workpiece, also move axially to some extent. Such axial movement is undesirable for several reasons. For example, the workpiece can become marred or shifted axially relatively to the chuck, or the collet actuating mechanism may be subjected to undue strain. In other chuck constructions intended for the same purpose as that herein disclosed, the clamping jaws must be capable of substantial radial movement and to obtain the desired extent of radial movement, it frequently has been necessary to utilize unduly heavy actuating mechanisms. Another disadvantage of known chucks is that the jaws do not necessarily grip a workpiece with equal force. Particularly is this true if the workpiece is somewhat out of round.

An object of this invention is to provide an annular chuck having a plurality of radially adjustable work-engaging jaws and in which the jaws are so constructed that they move radially only into and out of clamping engagement with a workpiece.

Another object of the invention is to provide an annular chuck of the character described and in which all jaws at one end of the chuck move simultaneously into and out of clamping engagement with a workpiece.

A further object of the invention is to provide an annular chuck of the kind referred to wherein the radial movement of the jaws is such as to assure self-centering of a workpiece clamped within the chuck.

Another object of the invention is to provide an annular chuck having a large diametral opening as compared to its annular width and without sacrificing radial adjustability of the jaws.

Another object of the invention is to provide an annular chuck having work-gripping jaws which are so constructed as to enable each jaw to grip a workpiece with substantially the same force.

Other objects and advantages of the invention will be pointed out specifically or will become apparent from the following description when it is considered in conjunction with the appended claims and the accompanying drawings, in which:

FIG. 1 is a fragmentary, side elevational view on a reduced scale of a chuck constructed in accordance with the invention and supporting an annular workpiece;

FIG. 2 is an enlarged, fragmentary sectional view taken on the line 2—2 of FIG. 1;

FIG. 3 is a fragmentary end elevational view of the apparatus; and

FIG. 4 is a sectional view taken on the line 4—4 of FIG. 2.

Apparatus constructed in accordance with the disclosed embodiment of the invention comprises an annular frame member 1 supported on a pedestal 2 which may be mounted on a base 3. Rotatably journaled within the member 1 by bearings (not shown) is an annular spindle or support 4. Any suitable and conventional driving means (not shown) may be connected to the support 4 for effecting rotation of the latter within the member 1.

The inside diameter of the spindle 4 is sufficiently large to accommodate an elongated cylindrical or annular workpiece 5 of such length as to enable it to project beyond both ends of the member 4. The outside diameter of the workpiece 5 may vary within substantial limits, but it should be somewhat less than the inside diameter of the support 4 so as to enable the workpiece to be movable freely into and out of the support.

At each end of the support 4 is a clamping jaw assembly designated generally by the reference character 6. Each assembly is identical, so the assembly at one end only of the support will be described in detail.

The assembly 6 includes a mounting ring 7 which is secured to the spindle 4 by a plurality of bolts 8, one of which is shown in FIG. 2. The ring 7 includes a locating flange 9 which nests with the spindle 4 and assists in assembly of the ring with the spindle. At the inner end of the ring 7 is a smooth shank portion 10 and at the outer end of the ring 7 is an enlarged flange 11. Between the inner and outer ends of the ring is an intermediate, externally threaded portion 12.

At circumferentially spaced intervals the ring 7 is provided with radial slots 13. Communicating with each slot 13 is a radial groove 14 having a base 15. Accommodated in each slot 13 is a carrier block 16 having at its inner or rearward end a tongue 17 which projects into the groove 14. Between the base 15 of the groove 14 and the tongue 17 is a compression spring 18 which constantly biases the carrier 16 radially outwardly.

As is best illustrated in FIG. 4, the carrier 16 is substantially T-shaped in cross section and has a stem 19 which projects forwardly of the ring 7. The stem 19 is accommodated in a radial slot 20 which is formed in a retaining ring 21 that is fixed to the ring 7 by screws 22. The arrangement is such that each of the carriers is prevented from inadvertent removal from its slot 13, but is capable of free radially inward and outward movements.

An operating scroll member is provided for effecting radial movements of the carriers 16 and comprises a ring 23 having an interiorly threaded flange 24 at its inner end in threaded engagement with the threaded portion 12 of the mounting ring 7. Rotation of the ring 23 relative to the ring 7 effects axial movement of the ring 23. Between its ends, the ring 23 is provided with a forwardly and radially outwardly inclined actuating cam surface 25 which extends circumferentially of the ring. Each carrier 16 has an actuating cam surface 26 which confronts and bears against the cam surface 25, the spring 18 maintaining the cam surfaces 25 and 26 in engagement. The construction and arrangement are such that, when the operating ring 22 is rotated in a direction to cause it to move axially to the right, as viewed in FIG. 2, the cam surface 25 bears against the cam surface 26 on each of the carriers 16 and causes each of them simultaneously to be moved radially inwardly against the force of the respective springs 18. Rotation of the operating ring 22 in the opposite direction enables the springs 18 to move the respective carriers 16 radially outwardly.

A workpiece clamping jam 28 is associated with each carrier 16 and in each instance comprises an arcuate bar 29 pivoted intermediate its ends on its respective carrier 16 by means of a pivot pin 30. The curvature of each bar 29 is the same and corresponds to the curvature of the mounting ring 7. Adjacent opposite ends of each bar 29, and equidistant from the axis of the pivot 30, is a radially extending, threaded opening 31 in which is mounted a radially adjustable, correspondingly threaded, workpiece-engaging foot 32. The location of each foot 32 is such that it extends along a line passing through the center of the rotatable spindle member 4.

To condition the apparatus for operation, the operating scroll 22 is rotated in such direction as to enable the carriers 16 and their associated jaws 28 to move radially outwardly a distance sufficient to permit the workpiece 5 to be accommodated within the support 4. The operating scroll 22 at either or both ends of the apparatus then may be rotated in the opposite direction so as to cause the carriers 16 and their associated jaws 28 simultaneously to move radially inwardly toward the workpiece 5. To facilitate rotation of the scroll member 22, a plurality of openings 33 may be provided therein to accommodate a suitable wrench or lever.

As the jaws at each end of the chuck move inwardly, the work-engaging feet 32 of the lowermost jaw will engage the workpiece 5 and lift the latter off the lowermost surface of the support 4 toward the other jaws, thereby effecting centering of the workpiece 5. As the jaws continue to move radially inwardly, the respective bars 29 will be able to rock about their pivots 30, in the event of any out-of-roundness or eccentricity of the workpiece 5, so as to enable each work-engaging foot 32 to bear with uniform force against the workpiece. The workpiece then may be subjected to the required machining operation.

When machining of the workpiece has been completed, the operating scroll members 22 may be rotated in such directions as to cause them to move inwardly or toward one another, thereby enabling the jaws to release the workpiece under the influence of the respective springs 18.

As is apparent from FIG. 3, the annular width of the clamping assembly 6 is relatively small as compared with the diameter of the opening in which the workpiece is to be accommodated. Moreover, the slope of the cooperating cam surfaces 25 and 26 may be such as to permit relatively large radial movement of the jaws 28 as compared to the axial movement of the scroll 22. Consequently, the mass of the rotating parts is not excessive. As a result, a single chuck is capable of accommodating workpieces of greatly differing diameters.

Inasmuch as the movement of the jaws toward and away from the workpiece is wholly radial, there can be no tendency on the part of the jaws to cause axial movement of the workpiece. Consequently, there is no likelihood of marring the surface of the workpiece, nor is there any risk of damaging the jaws due to relative axial movement between the workpiece and the jaws.

The disclosure is representative of the presently preferred embodiment of the invention, but is intended to be illustrative rather than definitive thereof. The invention is defined in the claims.

I claim:

1. A chuck construction comprising an annular support member rotatable about an axis; a plurality of uniformly circumferentially spaced carriers; means mounting said carriers at least at one end of said support member for movements radially of said axis; a plurality of arcuate jaw members corresponding in number to the number of said carriers and having a curvature corresponding substantially to the curvature of said support member; means mounting said jaw members one on each of said carriers for radial movements therewith and for rocking movements about an axis parallel to the axis of rotation of said support member; work engaging means at opposite ends of each of said jaws and spaced uniformly from the axis of rocking thereof; an actuating scroll member mounted on said support member for movements axially thereof; and operating means acting between said scroll member and each of said carriers for simultaneously moving all of said carriers radially of said support member in response to relative axial movement of said scroll member and said support member.

2. The construction set forth in claim 1 wherein said scroll member is rotatable relatively to said support member.

3. The construction set forth in claim 1 wherein said operating means comprises a cam on said scroll member and a cam on each of said carriers engageable by the cam on said scroll member.

4. The construction set forth in claim 1 including spring means acting between said support member and each of said carriers and biasing the latter in one direction radially of said support member.

5. The construction set forth in claim 4 wherein said spring biases said carriers radially outwardly.

6. The construction set forth in claim 1 wherein said work engaging means comprises a pair of foot elements on each of said jaw members, each of said foot elements extending along a line intersecting the axis of rotation of said support member; and means for adjusting each of said foot elements independently of the other relatively to its associated jaw toward and away from said axis.

7. The construction set forth in claim 1 wherein said scroll member is threaded onto the periphery of said support member and overlies said carriers, said jaws being mounted on said carriers in axially spaced relation to said scroll member so as to be free from interference with said scroll member.

References Cited

UNITED STATES PATENTS

| 1,312,628 | 3/1918 | Gydesen | 279—69 |
| 2,670,215 | 2/1954 | Fishwick | 279—69 XR |
| 2,690,915 | 10/1954 | Pealer | 279—114 |
| 2,926,922 | 3/1960 | Vermette | 279—114 |
| 3,151,871 | 10/1964 | Multer | 279—123 |

FOREIGN PATENTS 113,800     1900    Germany.

ROBERT C. RIORDON, Primary Examiner

D. D. EVENSON, Assistant Examiner

U.S. Cl. X.R.

279—123, 69